(12) United States Patent
Al-Khayyat

(10) Patent No.: US 8,804,327 B2
(45) Date of Patent: Aug. 12, 2014

(54) PORTABLE WORKSTATION

(71) Applicant: UMM Al-Qura University, Makkah (SA)

(72) Inventor: Misa'a Abdul Jabbar Al-Khayyat, Jeddah (SA)

(73) Assignee: UMM Al-Qura University, Makkah (SA)

( * ) Notice: Subject to any disclaimer, the term of this patent is extended or adjusted under 35 U.S.C. 154(b) by 69 days.

(21) Appl. No.: 13/632,778

(22) Filed: Oct. 1, 2012

(65) Prior Publication Data

US 2014/0092545 A1 Apr. 3, 2014

(51) Int. Cl.
*G06F 1/16* (2006.01)

(52) U.S. Cl.
USPC .............. 361/679.41; 361/679.55; 361/679.09

(58) Field of Classification Search
USPC .............. 361/679.09, 679.55, 679.41, 679.32, 361/679.48, 728, 729, 730, 735; 348/373, 348/375, 552; 358/1.13, 296, 906, 909.1, 358/401; 174/50, 520, 524, 559
See application file for complete search history.

(56) References Cited

U.S. PATENT DOCUMENTS

| | | | |
|---|---|---|---|
| D296,788 S | 7/1988 | Scheider et al. | |
| 4,852,032 A * | 7/1989 | Matsuda et al. | 361/679.27 |
| 5,157,585 A * | 10/1992 | Myers | 361/679.17 |
| 5,242,056 A * | 9/1993 | Zia et al. | 206/576 |
| 5,305,183 A * | 4/1994 | Teynor | 361/679.55 |
| 5,663,867 A * | 9/1997 | Honda et al. | 361/679.32 |
| 5,774,331 A * | 6/1998 | Sach | 361/679.55 |
| 6,081,207 A | 6/2000 | Batio | |
| 6,128,186 A * | 10/2000 | Feierbach | 361/679.27 |
| 6,219,229 B1 * | 4/2001 | Lee | 361/679.08 |
| 6,781,823 B1 * | 8/2004 | Nyack | 361/679.29 |
| 6,799,853 B2 | 10/2004 | Silverbrook et al. | |
| 7,002,793 B2 * | 2/2006 | Imsand | 361/679.04 |
| 7,603,615 B2 | 10/2009 | Lee et al. | |
| 8,134,831 B1 * | 3/2012 | Hernandez | 361/679.55 |
| 2005/0134726 A1 * | 6/2005 | Parulski et al. | 348/373 |
| 2005/0237705 A1 * | 10/2005 | Moskaluk et al. | 361/683 |
| 2007/0013873 A9 | 1/2007 | Jacobson et al. | |
| 2009/0091885 A1 * | 4/2009 | Burford | 361/679.55 |
| 2009/0322967 A1 | 12/2009 | Liou et al. | |
| 2011/0043579 A1 * | 2/2011 | Leppanen | 347/104 |
| 2011/0279688 A1 | 11/2011 | Liu | |
| 2013/0114098 A1 * | 5/2013 | Legrande | 358/1.13 |
| 2013/0294021 A1 * | 11/2013 | Zhao | 361/679.09 |

FOREIGN PATENT DOCUMENTS

JP 2003-209646 7/2003
TW 201102741 A1 1/2011

* cited by examiner

*Primary Examiner* — Robert J Hoffberg
*Assistant Examiner* — Michael Matey
(74) *Attorney, Agent, or Firm* — Richard C. Litman

(57) ABSTRACT

The portable workstation includes a portable housing and a plurality of office modules disposed therein. The office modules include a computer module, a scanner module, printer module and a projector module. The computer module is the main interface for operating the other modules. A plurality of fans are disposed at the rear of the housing to cool the interior of the housing by expelling heated air generated by the different modules during use. The fans and all the modules are connected to a single rechargeable battery module. The various modules contained in the housing provide the user with all the necessary tools to perform any task at any locale.

7 Claims, 4 Drawing Sheets

PORTABLE WORKSTATION

BACKGROUND OF THE INVENTION

1. Field of the Invention

The present invention relates to productivity tools, and particularly to portable workstation that provides the functionality of various office tools in a single, portable device for many modern tasks.

2. Description of the Related Art

The current working environment for many requires the use of various computer and electronic devices, such as desktop and laptop computers, printers, copiers and the like. In addition to the many powerful and productive capabilities of such devices, these types of devices have become smaller in form with increases in technology. These advances have made working at home feasible and became a great boon for those who must frequently travel as part of their work assignments.

In most instances, users, such as students, academies and business personnel, tote a laptop computer to satisfy most of their working needs. However, there are many instances in which other peripherals, such as the printer mentioned above, may be required. This typically results in productivity downtime in locating an available peripheral. If one has ready access to the peripherals, e.g., portable peripherals, additional space and power sources may be required to operate the peripherals, which can be problematic in locales where space and power availability may be a premium. Additionally, this adds considerable hassle, inconvenience and time loss due to the number of carry bags one must tote, as well as increased weight and hampered maneuverability from the bulky conglomeration of devices. It would also make operation of such devices in a vehicle a difficult proposition, at best.

There exist some solutions that typically involve multiple functions in a single device. One solution includes a laptop with an integrated projector for presentation purposes. While functional, it is limited to the functionality of only two devices. Another solution includes a plurality of productivity devices incorporated in a box-like structure resulting in a rather large and cumbersome apparatus that must be plugged into a continuous power source, which does not lend itself to being a truly portable device that can be used in almost any locale.

In light of the above, it would be a benefit in the art of productivity tools to provide a portable device that includes the functionality of various office tools in a small, portable form factor. Thus, a portable workstation solving the aforementioned problems is desired.

SUMMARY OF THE INVENTION

The portable workstation includes a portable housing and a plurality of office modules disposed therein. The office modules include a computer module, a scanner module, printer module and a projector module. The computer module is the main interface for operating the other modules. A plurality of fans is disposed at the rear of the housing to cool the interior of the housing by expelling heated air generated by the different modules during use. The fans and all the modules are connected to a single rechargeable battery module. The various modules contained in the housing provide the user with all the necessary tools to perform of any task at any locale.

These and other features of the present invention will become readily apparent upon further review of the following specification and drawings,

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
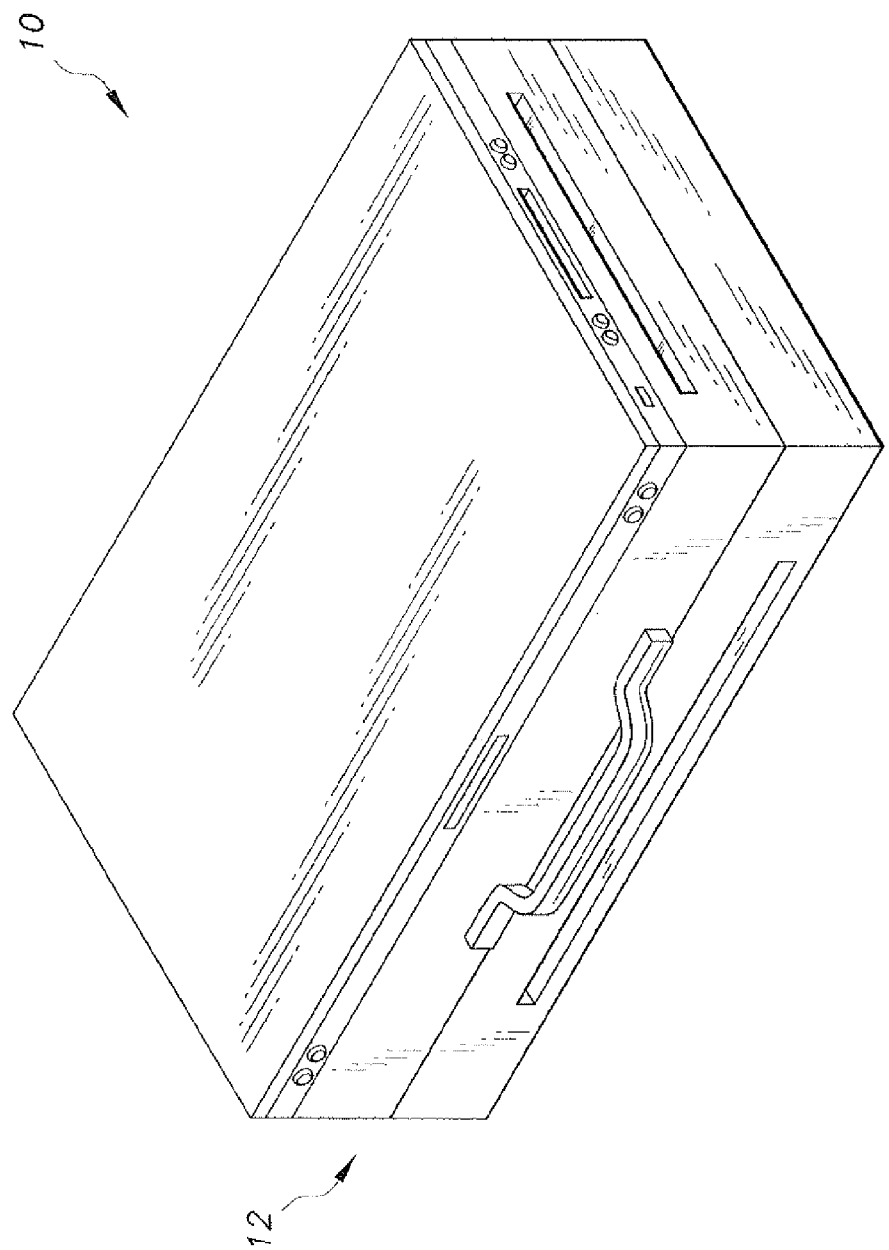
FIG. 1 is a perspective view of a portable workstation according to the present invention.
Figure 2:
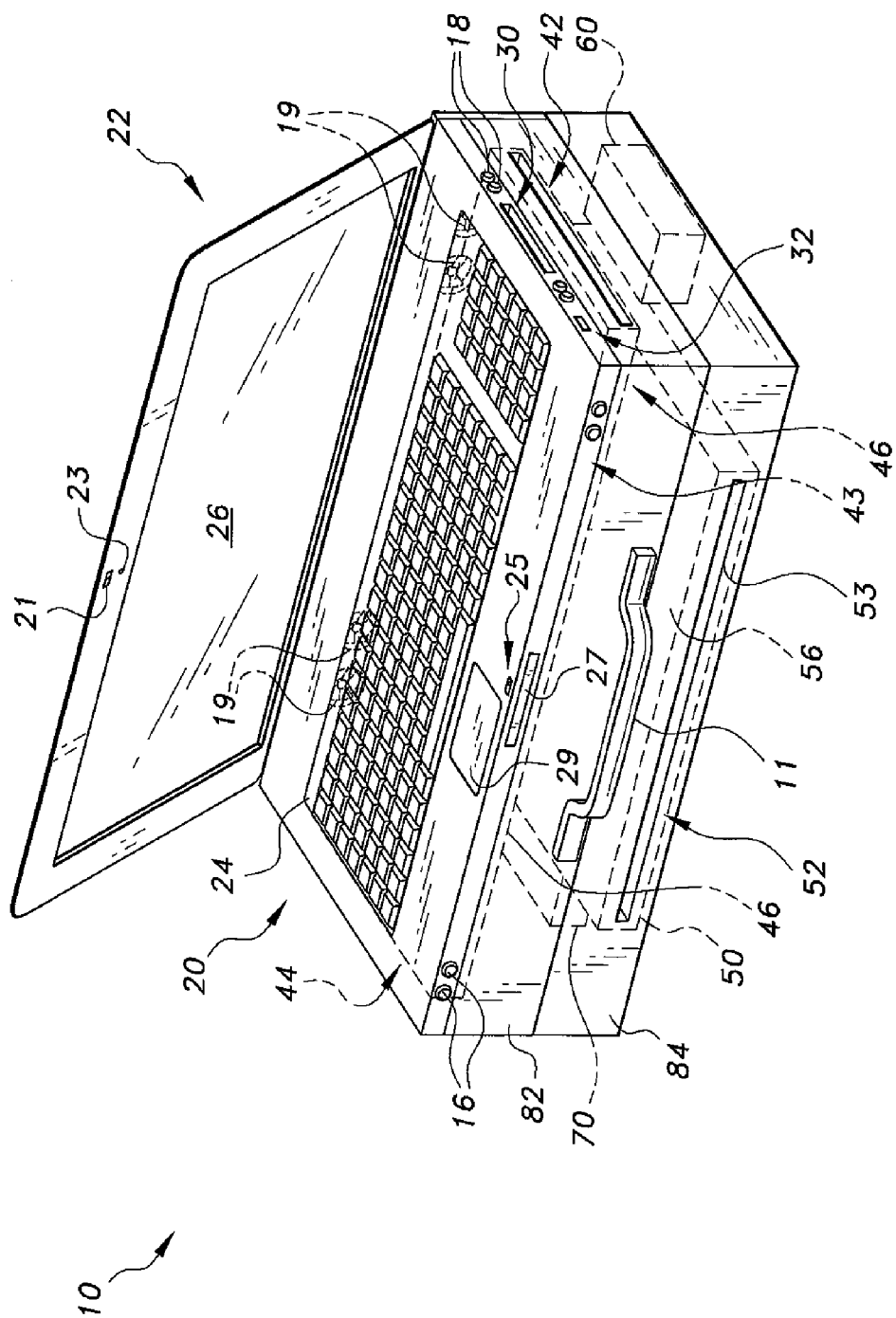
FIG. 2 is a perspective view of the portable workstation shown in FIG. 1, shown with the computer monitor unfolded.
Figure 3:
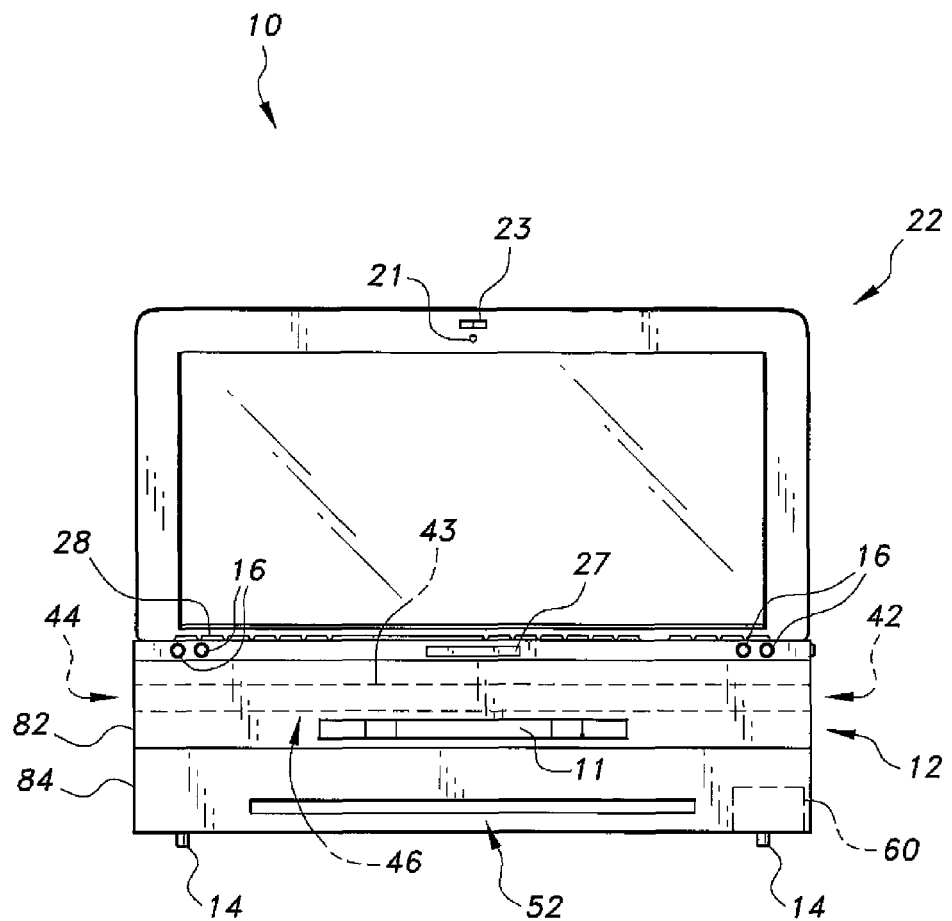
FIG. 3 is a front view of the portable workstation shown in FIG. 2.
Figure 4:
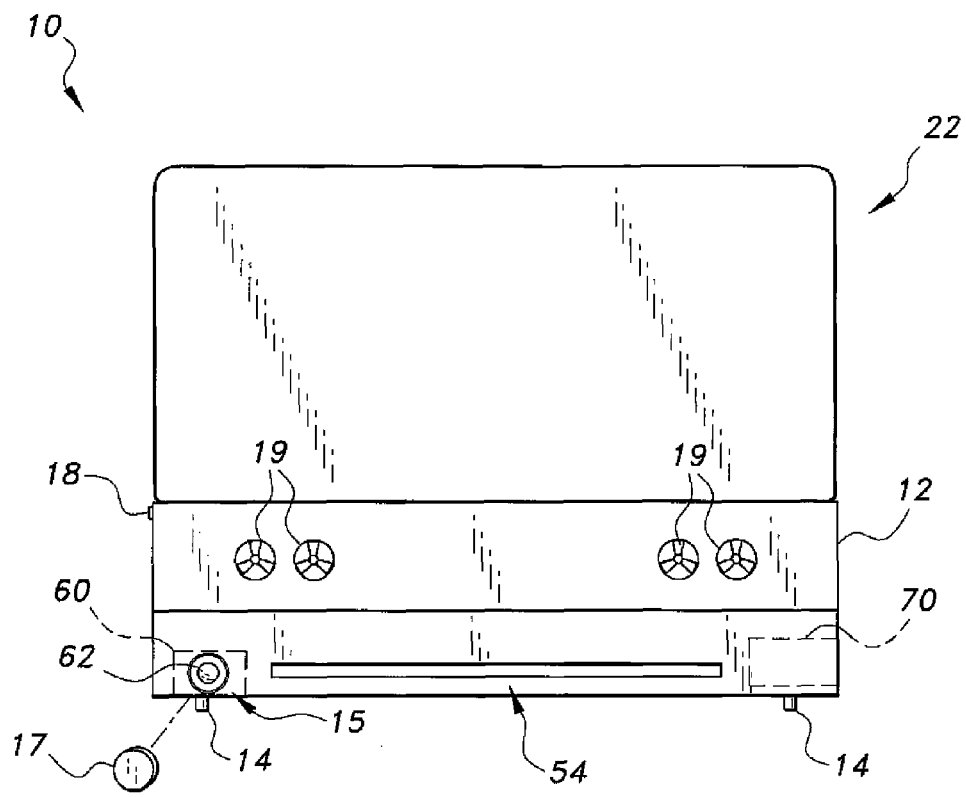
FIG. 4 is a rear view of the portable workstation shown in FIG. 1.
Figure 5:
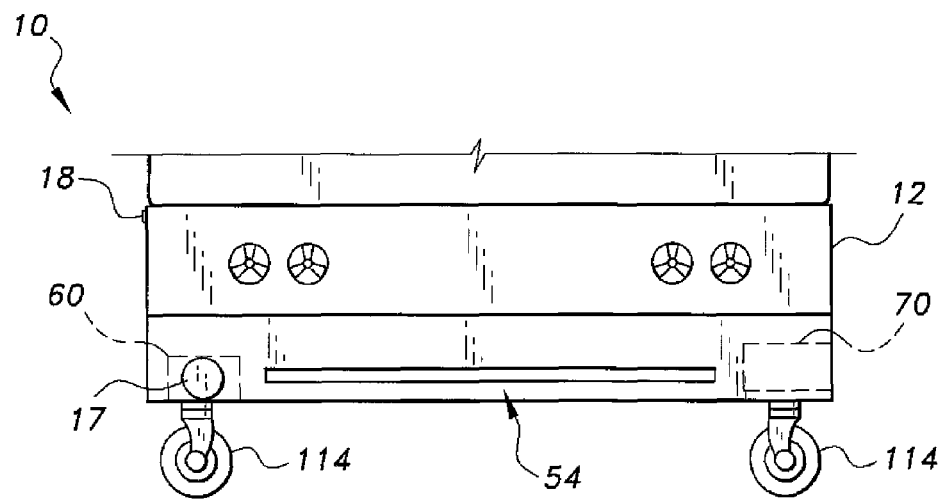
FIG. 5 is a partial view of an alternative embodiment of a portable workstation according to the present invention having wheels instead of feet.

The portable workstation, generally referred to in the drawings by the reference number 10, provides many of the necessary office components of a modern workstation in a single, portable device. As shown in FIGS. 1 and 2, the portable workstation 10 includes a box-shaped case or housing 12. The housing 12 holds and supports office components, which will be further described below. In the preferred embodiment, the housing is preferably about the size of an attach case and constructed from durable plastic that can provide a sturdy, protective support for the components housed therein. Alternatively, the housing can be constructed from lightweight steel and/or other metals, such as aluminum, for similar purposes and benefit without compromising weight, The dimensions of the housing are preferably about 10 cm (h), 33 cm (1), 23 cm (d), where "h" refers to the height with respect to a horizontal support surface, "1" refers to the length and "d" refers to the depth. The housing can be provided with a plurality of feet 14, as shown in FIGS. 3 and 4, to stably support the portable workstation 10 on a work surface. Alternatively, the feet 14 can be replaced with locking wheels 114, as shown in FIG. 5, for easier transport and placement of the portable workstation 10. The locking wheels 114 allow the user to selectively lock the wheels 114 to prevent the same from rolling as desired by the user. The housing 12 also includes a handle 11 to help the user carry or transport the portable workstation 10.

The upper portion of the housing 12 includes a computer component, section or module 20. Much like a laptop computer, the computer module 20 is divided into two main subsections, a selectively foldable monitor 22 and an input base 24. The monitor 22 includes a display 26 for showing text and graphics in color and/or grayscale. The monitor 22 can also include a webeam 21 for video conferencing or interface. The input base 24 includes a keyboard 28 for manual input of commands and data and a touchpad 29 for manipulating an onscreen pointer. One of the sides of the input base 24 can be provided with an input slot 30 for ingress and egress of computer readable media, such as CDs, DVDs, and Blu-ray™ Discs. The portable workstation 10 also includes at least one USB (universal serial bus) port 32 for external thumb drives and other USB devices. Other ports, such as HDMI, Ethernet, LAN, DVI, to Firewire™, etc., can also be provided on the computer module 20 to expand the connectivity, data storage/delivery, and display options for the user. The computer module 20 serves as the main interface for controlling the other workstation components. The upper portion of the housing 12 also includes a plurality of front buttons 16 and side buttons 18 that control basic operation of the various office tools, such as power activation, injection or ejection of discs, paper/document feed, etc.

Since the portable workstation 10 is configured for portability and transport, it is imperative that the monitor 22 is securely folded prior to any transport movement. Otherwise, the user faces an accidental break or dislodging of the monitor 22. In order to secure the monitor 22 for transport, the monitor 22 includes a latch 23 that slidably engages a lock in the locking slot 25 on the input base 24. Once latched, the portable workstation 10 can be moved without concern for the monitor 22. A lock button 27 is disposed in front of the housing 12 for the user to push and unlock the latch.

One of the other integrated or included office tools is a scanner component, section or module 40. As shown in FIGS. 1-4, the scanner module 40 includes an inlet slot 42, an outlet slot 44 and a scanning mechanism 46 disposed between the inlet and outlet slots 42, 44. In the preferred embodiment, the slots 42, 44 are disposed on either side of the housing 12. A channel 43 extends the length of the housing 12 and communicates with the slots 42, 44 to define a passage for a document to be scanned. Each slot 42, 44 may include at least one roller (not shown) for respectively feeding and expelling the document to he scanned in a manner well known in the art. In use, the user feeds the document through the input slot 42 until the document reaches a point where it can be scanned by the scanning mechanism 46. After scanning, the document is expelled through the outlet slot 44. The scanner module 40 also functions as a copier, since in both instances, an image of the document is taken for further processing, e.g., printing or image manipulation. As shown in the drawings, the scanner module 40 is preferably disposed below the computer module 20.

Another of the integrated or included office tools is a printer component, section or module 50. As shown in FIGS. 1-4, the printer module 50 includes an inlet slot 52 disposed on the front of the housing 12, an outlet slot 54 disposed on the back of the housing 12 and a printing mechanism 56 disposed between the inlet and outlet slots 52, 54. A channel 53 extends the depth of the housing 12 and communicates with the slots 52, 54 to define a passage for paper to be printed. Similar to the scanner module 40 mentioned above, the feeding and expelling of the paper to be printed are facilitated by mechanisms known in the art. In use, the user feeds paper through the inlet slot 52, and as it passes the printing mechanism 56, the printing mechanism 56 prints the desired image onto the paper. Then the printed paper is expelled through the outlet slot 54. As shown, the printer module 50 is preferably disposed at the bottom of the housing 12.

The computer module 20, the scanner module 40 and the printer module 50 are operatively connected to each other, either wired or wireless, so that all these components seamlessly work together. For example, the printer module 50 prints any desired information from the computer module 20 or the scanner module 40. The scanned image from the scanner module 40 can be uploaded to the computer module 20 and/or directly printed via the printer module 50, etc. It is understood that software dictates how these modules function together, but the connection between the various modules allow these functions to occur.

A further tool integrated or included with the office tools is a projector module 60. At times it may be necessary for the user to provide a visual presentation, and the projector module 60 allows the user to do so directly from the portable workstation 10. As shown in FIGS. 2-4, the projector module 60 is preferably disposed at the bottom right corner of the housing 12. A cutout or opening 15 at the corresponding rear of the housing 12 exposes the lens 62 so that an image can be projected onto a target surface. The cutout 15 can be selectively covered by a cap 17 to protect the lens 62 when not in use. The cap 17 can be a separate snap fit element or a selectively slidable element on the housing 12.

All the above components or modules generate heat during use, especially within the confines of the housing 12. Excessive heat can potentially damage sensitive electronic components and slow operation thereof. In order to alleviate heat, the housing 12 includes a plurality of electric fans 19 disposed at the rear of the housing 12. Preferably, the fans 19 are configured to pull air from inside the housing 12 to the outside in order to cool the internal modules. However, they can also be configured so that one pair pulls air from outside while the other pair expels the interior air to thereby circulate air throughout the interior. The fans 19 can also be single speed or variable speed, and in the case of the latter, selectively controlled via one of the operating front buttons 16 or side buttons 18.

The power for all the modules is supplied by a power module 70 disposed on the bottom left side of the housing 12. The power module 70 is preferably a high capacity rechargeable battery that can reliably provide long-lasting power to the modules mentioned above. The power module 70 can also be selectively connected to a source of continuous power, e.g., an AC outlet, to facilitate charging thereof or for long sessions of continuous use. The power module 70 can also include power management features that, e.g., automatically shut down power to modules that have been idle for a select, extended period of time in order to conserve power.

At times it may be necessary to access the interior of the housing 12 for routine cleaning and maintenance of the various components. To facilitate maintenance, the housing 12 can be constructed so that the housing 12 is constructed in two parts, an upper part 82 and a lower part 84. The two parts 82, 84 can be latched, hinged, and/or fastened together so that the upper part 82 is removable from the lower part 84. In so doing, the interior of the housing 12 is exposed so that the user may perform periodic cleaning, maintenance and troubleshoot any problems that may arise, e.g., paper jam, ink/ink cartridge replacement, bulb replacement, etc.

Thus, it can be seen that the portable workstation 10 provides an all-in-one solution for most office needs. The portable workstation 10 can be conveniently carried to school, home or office with all the functions ready and available in one device. Moreover, the portable workstation 10 can be easily operated in a vehicle without the conventional hassles of clutter from separate components spread around the vehicle.

It is to be understood that the portable workstation 10 encompasses a variety of alternatives. For example, the various modules 20, 40, 50, 60 can be provided from off-the-shelf electronic devices. The housing 12 can be configured to accommodate and support different models of laptops, printers, scanners and projectors by having separate compartments for the above components. Each compartment can be provided with brackets or other securing means such as hook and loop straps for installing the respective components therein. Moreover, each of the inlet slots 42, 52 and outlet slots 44, 54 can be provided with document trays to support the papers being fed and discharged.

It is to be understood that the present invention is not limited to the embodiments described above, but encompasses any and all embodiments within the scope of the following claims.

I claim:

1. A portable workstation, comprising:

a substantially hollow housing having a front, a back, sides, a top, a bottom, a height, a length and a depth, the housing being configured to support a plurality of office modules therein, the housing having a handle;

a computer module of the office modules disposed on the top of the housing, the computer module having a monitor and an input base;

wherein said monitor is foldable from an unused, folded position to an unfolded, useable position, said monitor having a display for displaying text and graphics;

said input base has a keyboard for inputing of commands and input data and a touch pad for maneuvering a pointer on the display;

said input base has a plurality of buttons disposed in a front and on at least one of the sides thereof, the buttons facilitating selective basic operation of each of said computer module, scanner module, printer module or projector module;

said input base has at least one accessory port disposed on one of the sides thereof; and said input base has at least one computer readable media slot disposed on either the one of the sides or another of the sides thereof;

a scanner module of the office modules disposed below the computer module, the scanner module facilitating scanning and copying of select documents passing through the scanner module for further processing, the scanner module being operatively connected to the computer module;

a printer module of the office modules disposed at a bottom interior of the housing, the printer module facilitating printing of select documents onto paper being fed through the printer module, the printer module being operatively connected to the computer module and the scanner module;

a projector module of the office modules disposed inside the housing, the projector module facilitating projection of images onto a target surface, the projector module being operatively connected to the computer module;

a plurality of fans disposed at the back of the housing, the fans being configured to cool an interior of the housing by expelling heated air generated by the computer module, the scanner module, the printer module, and the projector module; and a rechargeable battery power source module disposed inside the housing opposite the projector module, the power source module providing power to the computer module, the scanner module, the printer module, and the projector module and the fans.

2. The portable workstation according to claim 1, wherein said at least one accessory port comprises a USB port.

3. The portable workstation according to claim 1, wherein said scanner module comprises an inlet slot disposed on one of the sides or the another of the sides of said housing; an outlet slot disposed on another of the one of the sides or the another of the sides of said housing; a channel extending the length of said housing and communicating with the inlet slot and the outlet slot to thereby form a passage for a document of the select documents to be scanned or copied; and a scanning mechanism disposed between the inlet slot and the outlet slot, the scanning mechanism generating an image of the document for the further processing.

4. The portable workstation according to claim 1, wherein said printer module comprises an inlet slot disposed on the front of said housing; an outlet slot disposed on the back of said housing; a channel extending the depth of said housing and communicating with the inlet slot and the outlet slot to thereby form a passage for the paper to be printed; and a printing mechanism disposed between the inlet slot and the outlet slot, the printing mechanism printing output data received from at least one of said computer module or said scanner module.

5. The portable workstation according to claim 1, wherein said projector module includes a lens, said housing having an opening formed on the back thereof for exposing the lens of said projector module, and a cap for selectively covering the opening in order to protect the lens when said projector module is not in use.

6. The portable workstation according to claim 1,futher comprising a plurality of feet disposed at select points on the bottom of said housing, the feet providing stable support For the portable workstation during use 7. The portable workstation according to claim 1, further comprising a plurality of locking wheels disposed at select points on the bottom of said housing, the wheels providing enhanced mobility for transport of the portable workstation and providing stable support when selectively locked to prevent rolling movement of the portable workstation.

* * * * *